(12) United States Patent
Lashley et al.

(10) Patent No.: US 7,003,085 B1
(45) Date of Patent: *Feb. 21, 2006

(54) CUSTOMER SERVICE PROCESS FOR REMOTELY ASSISTING USERS OF TELEPHONE AND MODEM SYSTEMS

(75) Inventors: David Glenn Lashley, Cartersville, GA (US); Robert L. Doss, Jr., Ringgold, GA (US)

(73) Assignee: Plantronics, Inc., Santa Cruz, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 10/243,025

(22) Filed: Sep. 12, 2002

(51) Int. Cl.
*H04M 3/22* (2006.01)
*H04M 11/00* (2006.01)
*H04M 3/00* (2006.01)

(52) U.S. Cl. ............... 379/102.02; 379/265.09; 379/27.01

(58) Field of Classification Search .............. 379/265.01–266.1, 27.01, 102.02
See application file for complete search history.

(56) References Cited

U.S. PATENT DOCUMENTS

| | | | | |
|---|---|---|---|---|
| 5,276,727 A | * | 1/1994 | Kim et al. | 379/27.07 |
| 5,734,713 A | | 3/1998 | Mauney et al. | |
| 5,761,292 A | * | 6/1998 | Wagner et al. | 379/229 |
| 5,896,451 A | | 4/1999 | Deas | |
| 5,915,026 A | * | 6/1999 | Mankovitz | 713/168 |
| 5,937,031 A | | 8/1999 | Stelman | |
| 6,160,873 A | * | 12/2000 | Truong et al. | 379/102.02 |
| 6,320,939 B1 | * | 11/2001 | Nulty et al. | 379/27.01 |
| 6,331,855 B1 | * | 12/2001 | Schauser | 345/502 |
| 6,550,006 B1 | * | 4/2003 | Khanna | 713/2 |
| 2002/0097851 A1 | * | 7/2002 | Daum et al. | 379/102.03 |

* cited by examiner

*Primary Examiner*—Ahmad F. Matar
*Assistant Examiner*—Hector Agdeppa (57) ABSTRACT

Systems and methods for remotely diagnosing, trouble shooting, and/or programming an end user telephone by a customer service representative using a telephone and modem system in communication with the user's telephone and modem system during a live telephone call between the customer service representative and the user are disclosed. The method for the user to obtain assistance from the customer service representative for the user system generally comprises initiating a telephone call to the representative, transmitting data signals containing information relating to the user system to the customer service system, speaking with the customer service representative, and receiving data signals that includes a command to control a remotely controllable feature of the user system from the customer service system, wherein the user and customer representative systems selectively alternate between data signal transmissions and voice signal transmissions.

32 Claims, 5 Drawing Sheets

CUSTOMER SERVICE PROCESS FOR REMOTELY ASSISTING USERS OF TELEPHONE AND MODEM SYSTEMS

RELATED APPLICATIONS

This application is related to U.S. application Ser. No. 10/243,026, entitled "DSP-Enable Amplified Telephone with Digital Audio Processing" and filed on Sep. 12, 2002 and U.S. application Ser. No. 10/243,003, entitled "Remotely Controlled Diagnostic Telephone System with Modem" and filed on Sep. 12, 2002.

BACKGROUND OF THE INVENTION

1. Field of the Invention

The present invention relates generally to high performance telephones. More specifically, systems and methods for remotely diagnosing, trouble shooting, and/or programming an end user telephone by a customer service representative using a telephone and modem system in communication with the user's telephone and modem system during a live telephone call between the customer service representative and the user are disclosed.

2. Description of Related Art

A conventional telephone typically provides an end user with a user manual and a customer service telephone number with which to assist the end user in learning, utilizing, diagnosing, trouble shooting and/or programming various features of the user's telephone. With increasingly more complex and feature-rich high performance telephones, the end user is more likely to encounter difficulties and to require personalized, one-on-one assistance with more advanced features of the telephone such as by means of a telephone call to a customer service representative.

One example of a high performance telephone is an amplified telephone that amplifies audio signals to allow hearing impaired users to use the telephone without other hearing aides. Amplified telephones typically have selectable features such as tone and volume control that, if not selected correctly, may not properly amplify audio signals as needed. The hearing impaired user generally would call the customer service center to speak with a trained customer service representative in an attempt to address the problem. The trained customer service representative would then walk the user through a manual diagnostic and fault finding process. However, especially when the user is less familiar with electronic equipment, the diagnostic and fault finding customer assistance process can quickly become confusing, frustrating, and exasperating for both the user and the representative. If the user is unable to successfully address the problem, the user may simply give up and return the telephone. However, oftentimes there is no fault with the returned telephone. Rather, the problem is with the user being unable to properly operate the telephone and/or with the customer service representative being unable to successfully determine and address the problems encountered by the user. One common problem is the user neglecting to select a boost feature on the telephone such that the user perceives the telephone as broken. As such, the return would be a no fault found return that could have been prevented if the customer service representative had been able to successfully assist the customer in determining and addressing the problem through the manual diagnostic and fault finding process performed during the customer service telephone call.

Thus, it would be desirable to provide a system and method for the customer service representative to better assist the user in a diagnostic, fault finding, and problem resolution process. Ideally, the customer service representative would be able to implement a fault finding process that is better suited at assisting the user and that can more easily and effectively address and correct the problem once it is identified.

SUMMARY OF THE INVENTION

Systems and methods for remotely diagnosing, trouble shooting, and/or programming an end user telephone by a customer service representative using a telephone and modem system in communication with the user's telephone and modem system during a live telephone call between the customer service representative and the user are disclosed. Although the system and method are generally described in terms of a diagnostic and trouble shooting process for a telephone, it is to be understood that the system and method may be adapted for application involving any product connected to a telephone line. It should be appreciated that the present invention can be implemented in numerous ways, including as a process, an apparatus, a system, a device, or a method. Several inventive embodiments of the present invention are described below.

The method for the user to obtain assistance from the customer service representative for the user system generally comprises initiating a telephone call to the representative, transmitting data signals containing information relating to the user system to the customer service system, speaking with the customer service representative, and receiving data signals that includes a command to control a remotely controllable feature of the user system from the customer service system, wherein the user and customer representative systems selectively alternate between data signal transmissions and voice signal transmissions.

The method for a customer service representative to provide assistance to a user generally comprises connecting a customer service telephone and modem system with the remote user system, receiving data signals containing information relating to the user system, speaking with the user, and transmitting data signals the include a command to control a remotely controllable feature of the user system to the user system, where the user and customer representative systems selectively alternate between data signals transmissions and voice signals transmissions. The command may control volume, frequency response, compression ratio, knee point, LED lights, and/or contents of programmable memory on the user system. The command may also administer self-diagnostic tests on the user system and/or hearing tests on the user to determine proper telephone settings for the user system.

The method may further include receiving response data signals from the user system, enabling the customer service system to determine a setting at which the remotely controllable feature of the user system is set. The customer service system preferably obtains user authorization to obtain the data signals containing information relating to the user system, such as during the step of speaking with the user or the initial step of connecting.

The customer service system may include a database, a display, an input device, and a customer service CPU executing a customer service software package, where the CPU is in communication with the database, display, and input device. The user system may be a DSP-enabled telephone system with a digital signal processor and a microprocessor. The DSP-enabled system may include A/D and D/A converters where data and voice signals transmitted between the user and customer service systems are analog and the A/D converter converts the analog data and voice signals to digital signals. The microprocessor utilizes the command to control the remotely controllable feature of the user system.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Systems and methods for remotely diagnosing, trouble shooting, and/or programming an end user telephone by a customer service representative using a telephone and modem system in communication with the user's telephone and modem system during a live telephone call between the customer service representative and the user are disclosed. It is noted that, although the system and method are generally described herein in terms of a diagnostic and trouble shooting process for a telephone and modem system, the system and method may be adapted for diagnostic and trouble shooting of any product that is connected to a telephone line. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
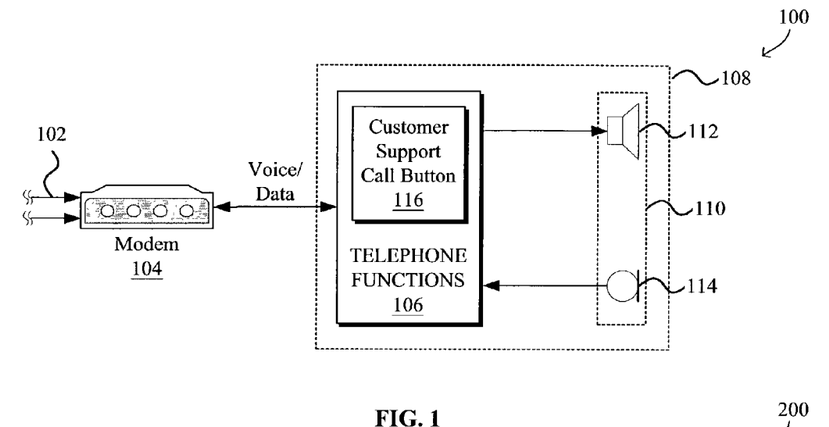
FIG. 1 is a block diagram illustrating an exemplary embodiment of a telephone and modem system located at a user site.

FIG. 1 is a block diagram illustrating an exemplary embodiment of a telephone and modem system 100 located at a user site. Telephone signals are carried over twisted-pair copper telephone wires 102 to and from a modem 104. It is noted that although physical telephone wires 102 are shown and described herein, any suitable method for telephone signal transmission may be implemented such as wireless cellular transmission. The modem 104 is in communication with telephone functions 106 of a telephone 108. The modem 104 may be, for example a 300 baud modem and may be physically separate from the telephone 108 or be integral with the telephone 108. The telephone 108 also includes a handset or headset 110 that is in communication with the telephone functions 106 of the telephone 108. The handset or headset 110 typically includes a speaker 112 and a microphone 114 as is well known. Alternatively, the speaker 112 and microphone 114 may be implemented as part of a speakerphone as is also well known.

Preferably, the telephone 110 provides a customer support call button 116. The customer or use may simply press the customer support call button 116 to easily and quickly connect with a customer service representative for assistance and support in configuring and diagnosing the telephone. The customer support call button 116 may be similar to a memory dial or speed dial button on a conventional telephone in that it is programmed with a customer support telephone number; such as a toll-free number. The customer support call button 116 may further provide optional additional features as will be described below.

Once the user is connected to the customer service representative, the telephone may perform an automatic identification and status reporting process in which various identification and/or status information relating to the user and/or the telephone is transmitted via the modem 104 to the customer service representative. To ensure privacy and security, transmission of such identification and status information is preferably only performed when the user initiates the customer service telephone call such as by pressing the customer support call button 116 and/or when the user grants authorization for the telephone and modem system 100 to transmit identification and status information to the customer service representative verbally and/or through an action such as by pressing the customer support call button 116 when the customer service representative requests that the customer to do so.

The modem 104 is preferably configured to receive all incoming data and voice signals transmitted over the telephone lines 102 and distinguishes and separates voice signals from data signals. The modem 104 preferably toggles between data and voice transmission, for example, by temporarily preventing voice transmission during data transmission and temporarily preventing data transmission during voice transmission. With voice signals, the modem 104 simply forwards the voice signals to the telephone 108 for processing. With data signals, the modem 104 may process the data signals in order to generate commands to or otherwise control the telephone 108 and/or may forward the data signals to the telephone 108 for processing. In response to the data signals received by the modem 104, the modem 104 and/or the telephone 108 is capable of controlling various telephone functions 106 such as toggling LED indicator lights on the telephone 108, adjusting various settings such as volume and tone controls on the telephone 108, and/or programming memory location contents on the telephone 108. The modem 104 and/or the telephone 108 may optionally be configured to perform tests for diagnosing potential problems with the telephone, determining settings on the telephone, and/or performing hearing tests to determine the proper settings for the user.

Figure 2:
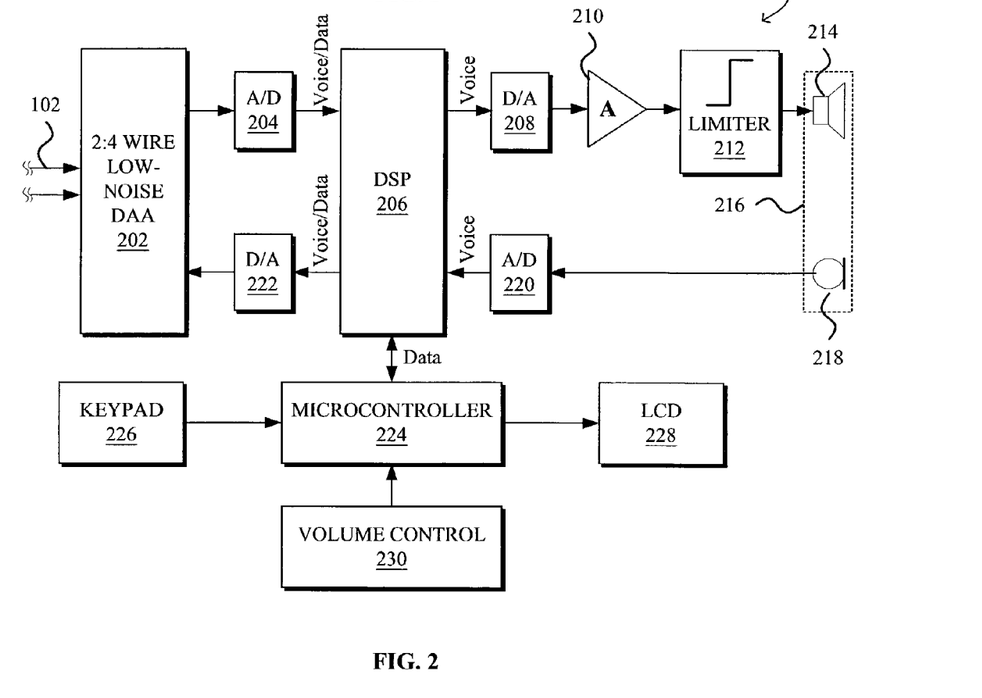
FIG. 2 is a block diagram illustrating an exemplary embodiment of a DSP-enabled telephone and modem system located at a user site in which the modem is implemented as part of a digital signal processor and/or a microcontroller.

In one preferred embodiment, the telephone functions include digital signal processing such as where the telephone is a DSP-enabled telephone. FIG. 2 is a block diagram illustrating an exemplary embodiment of a DSP-enabled telephone and modem system 200 located at a user site in which the modem is implemented as part of a digital signal processor 206 and/or a microcontroller 222. It is noted that although shown as separate components, the DSP 206 and microcontroller 222 may be a single integral component.

The amplified telephone and modem system 200 includes a 2:4 wire low-noise DAA (data access arrangement) 202 to receive signals from and transmit signals over twisted-pair copper telephone wires 102. The DAA 202 is a hybrid, i.e., a circuit that divides a single transmission channel into two, one for each direction, and/or combines two transmission channels into one. Thus, the DAA 202 divides a single transmission channel received from the twisted-pair copper wires 102 into two channels and combines two transmission channels into one transmission channel for transmission over the telephone wires 102.

The DSP-enabled amplified telephone and modem system 200 further includes a digital signal processor (DSP) 206 that digitally processes digital audio signals received from analog-to-digital (A/D) converters 204, 220 and outputs the processed digital signals to digital-to-analog (D/A) converters 208, 222. In particular, the A/D converter 204 converts analog signals received from the DAA 202 and outputs digital signals to the DSP 206. The D/A converter 208 converts digital signals received from the DSP 206 and outputs analog signals to an amplifier 210. The amplifier 210 outputs to a peak limiter 212 that limits the output level of a telephone speaker 214 of a handset or a headset 216, for example. The handset 216 also includes a microphone 218 that outputs to the A/D converter 220.

The DSP-enabled amplified telephone and modem system 200 preferably also includes a microcontroller 224, a keypad 226, a display such as an LCD display 228, and a volume control 230. The keypad 226 may be similar to a conventional telephone keypad with 0–9 digit keys for dialing and for optionally programming the telephone as well as other keys to facilitate the user with other functionalities of the telephone. The keypad 226 preferably includes text labels either directly on each key and/or adjacent to each key to indicate the function of each corresponding key. In addition, certain keys of the keypad 226 may optionally have LED lights adjacent to the key to indicate the status of the corresponding feature. For example, a lit LED light may indicate that the feature is selected, an unlit LED light may indicate that the feature is not selected, and a flashing LED light may indicate that the corresponding feature is being programmed and/or that there is an error with the corresponding feature. The LCD display 228 may display messages that, for example, facilitate the user in programming the telephone, caller ID information, and/or any other information. The volume control 230 allows the user to select a desirable amplification level. In addition, various switches may be provided to enable the user to select or program any given feature of the telephone such as volume, frequency response, compression ratios, and/or knee points of the DSP-enabled amplified telephone.

The microcontroller 224 interfaces between the DSP 206 and the keypad 226, the LCD display 228, and the volume control 230. For example, the microcontroller 224 may transmit data containing user inputs received via the keypad 226 and/or the level at which the volume control 230 is set to the DSP 206. The microcontroller 224 also receives data from the DSP 206 that can be displayed on the LCD 228.

Generally, the DSP 206 provides at least one digital audio processing algorithm that is generally more complex than simple volume and tone control. Specifically, the DSP 206 preferably provides digital signal processing algorithms similar to those provided by digital hearing aid products that typically result in the amplified telephone amplifying soft sounds more than loud sounds and preferably is customizable for the individual user in order to achieve optimal results. Preferably, several audio processing modes or methodologies are provided by the DSP 206 of the telephone. Examples of audio processing modes that may be implemented in the DSP 206 include input compression, output compression, treble increase at low levels (TILL), bass increase at low levels (BILL), programmable increase at low levels (PILL), and finite impulse response (FIR) filter tone control. The mode best suited for the user can be selected based on the hearing loss characteristics specific to the individual user and is typically more complicated than simple volume and tone control.

As noted above, the modem and its associated functions are preferably implemented as part of the digital signal processor 206, A/d and D/A converters 204, 222, and/or the microcontroller 222. For example, the modem may be implemented as part of the DSP/modem 206 such that the DSP/modem 206 is configured to distinguish and separate voice signals from data signals. The voice signals would then be transmitted to the D/A converter 208 while the data signals would be transmitted to the microcontroller 224 for processing thereby. Alternatively, the DSP/modem 206 may additionally process the data signals in order to generate commands to or otherwise control the telephone via the microcontroller 224. As noted above, although shown as separate components, the DSP/modem 206 and microcontroller/modem 222 may be a single integral component with their functionalities being integrally provided by the DSP/microcontroller/modem.

Figure 3:
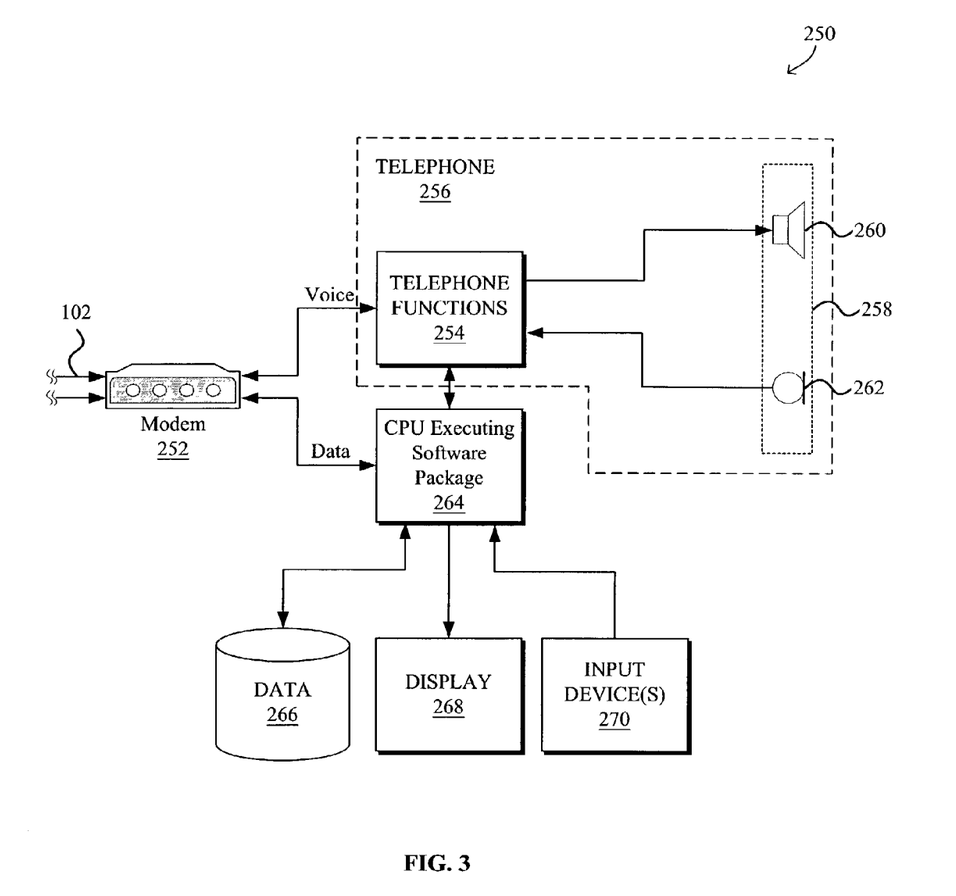
FIG. 3 is a block diagram illustrating an exemplary embodiment of a telephone and modem system located at a customer service site.

FIG. 3 is a block diagram illustrating an exemplary embodiment of a telephone and modem system 250 located at a customer service site. A customer service representative utilizes the telephone and modem system 250 to communicate with a customer and his telephone and modem system such as those described above with reference to FIGS. 1 and 2. The customer service telephone and modem system 250 generally comprises a modem 252 for receiving telephone signals over the twisted-pair copper telephone wires 102. The modem 252 is in communication with telephone functions 254 of a customer service telephone 256. The modem 252 may be, for example a 300 baud modem and may be physically separate from the telephone 256 or be integral with the telephone 256. The customer service telephone 256 similarly includes a headset or handset 258 that is in communication with the telephone functions 106 of the telephone 108. The headset 258 typically includes a speaker 260 and a microphone 262 as is well known. Alternatively, the speaker 112 and microphone 114 may be implemented as part of a speakerphone as is also well known.

The customer service telephone and modem system 250 further includes a CPU 264 executing a customer service software package. The CPU 264 is in communication with a database 266, a display 268 such as a computer monitor, and an input device 270 such as a keyboard, a mouse, and/or a touch screen. Although shown as separate components, the modem 252 and the CPU 264 are typically integrated into a single component. However, for purposes of clarity, they will be described as separate components herein. The CPU 264 receives input data entered by the customer service representative via the input device 270, outputs data by displaying information on the display 268 for the customer service representative, and/or retrieves data from and stores data into the database 266.

A single database 266 is preferably shared by and/or accessible by all customer service representatives within an organization or division over an internal network or an intranet, for example. Data in the database 266 may include information for each available mode of the user telephone, as well as information specific to each user telephone and each user of the telephone. For example, information specific to each user telephone may include make, model, date of manufacture, and/or serial number of the user telephone, stored error codes, line length, power status, memory location contents, memory settings, switch settings, menu settings, telephone line length to the first switch, diagnostic and error resolution information from past customer service calls, current status, feature use statistics, hours of use, address and phone number associated with the telephone, ringer volume setting, visual ringer setting, and/or number and identifies of the users for the telephone.

Information specific to each user of the telephone may include information such as identification of the user (e.g., name), hearing profile of the user, and/or the user's most recent telephone settings such as settings for volume, tone, frequency response, compression ratio, audio processing mode, and/or knee point settings where applicable. As is evident, any other suitable information may be stored in the database 266. The information stored in the database 266 can be entered by the customer service representative and/or recorded by and retrieved from the user telephone, for example.

The customer service modem 252 is preferably configured to receive all incoming data and voice signals transmitted over the telephone lines 102 and distinguishes and separates voice signals from data signals. The modem 252 preferably toggles between data and voice transmission, for example, by temporarily preventing voice transmission during data transmission and temporarily preventing data transmission during voice transmission. With voice signals, the modem 252 simply forwards the voice signals to the telephone 256 for processing. With data signals, the modem 252 preferably forwards the data signals to the CPU 264 in order for the CPU 264 to process the data signals.

The CPU 264 is adapted to generate commands for transmission to the customer telephone and modem system via the modem 252 and telephone wires 102. The commands are carried out by the customer telephone and modem system. Examples of commands may include adjusting various settings of the telephone, performing self-diagnostic tests, programming of memory location contents, turning on or off or toggling LED lights or other indicators of the telephone, etc.

Figure 4:
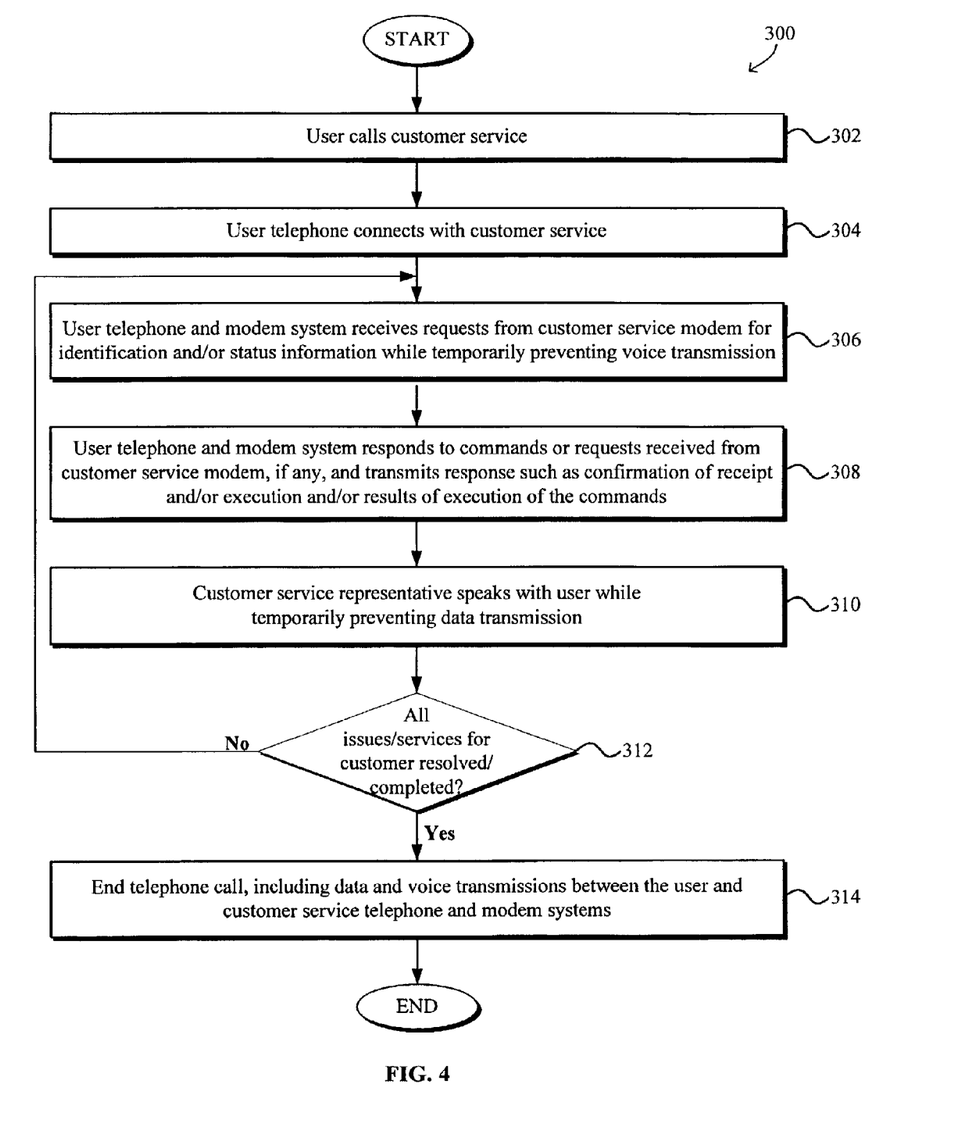
FIG. 4 is a flow chart illustrating a process for calling a customer service representative by the user for assistance with the user's telephone and modem system.

The process for the user to call the customer service representative for assistance and the process for the customer service representative in receiving calls from the user and providing assistance to the user will now be described with reference to FIGS. 4 and 5, respectively. Specifically, FIG. 4 is a flow chart illustrating a process 300 for calling the customer service representative by the user for assistance with the user's telephone and modem system. At step 302, the user initiates a call to customer service. The user may dial a customer service telephone number or, more preferably, the user may press a customer support call button, if provided, on the user telephone and modem system as described above. Typically, it is the user at the customer site who initiates the call although the customer service may initiate the call under certain circumstances.

At step 304, the user telephone is connected with the customer service telephone when the customer service answer the call. At this point, the user is greeted by and/or speaks with the customer service representative. The user is optionally requested to grant authorization for the customer service to obtain and download information from the user telephone. The user is preferably informed by the customer service representative that while data transmission is taking place, voice transmission will be temporarily prevented. At step 306, the user telephone modem receives requests from the customer service modem for identification and/or status information. During data transmission, the modem temporarily prevents voice transmission. A prerecorded message stored on the user telephone and modem system may play during data transmission reminding the user that voice transmissions are temporarily prevented.

At step 308, the user telephone responds to any commands or requests received from the customer service modem and optionally transmits a confirmation of receipt, confirmation of performance or execution of the commands, and/or results of the execution of the commands. Examples of commands are presented above and include retrieval and/or setting of settings, memories, identification data as noted above, and/or various other data from the telephone, adjusting various settings of the telephone, performing self-diagnostic tests on the telephone, programming of various memories of the telephone such as memory location contents, turning on or off or toggling LED lights or other indicators of the telephone.

At step 310, the user speaks again with the customer service representative speaks while the user and customer service modems temporarily prevent data transmission. The customer service representative would typically inquire as so any problems the user is experiencing or any questions that the user may have regarding the use of the user telephone and modem system. Alternatively or additionally, the inquiry may be made earlier such as in step 304. The customer service representative may also attempt to verbally address and resolve the customer's inquiries.

At step 312, a determination is made as to whether all issues for the user have been resolved and/or all services for the user have been completed. If not, then the process 300 returns and continues from step 306. Alternatively, the call between the user and customer service is terminated at step 314, ending all data and voice transmission between the two telephone and modem systems.

Figure 5:
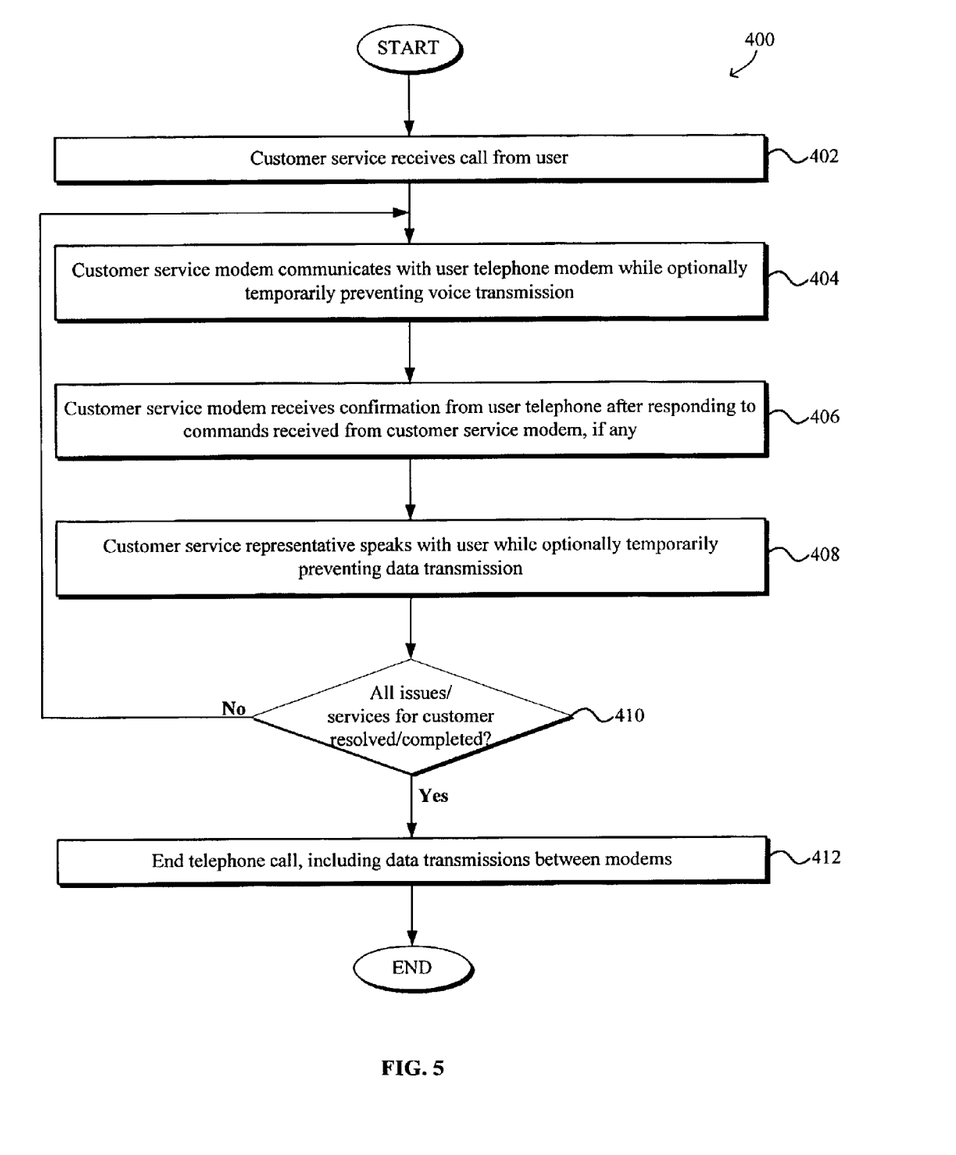
FIG. 5 is a flow chart illustrating a process for a customer service representative to assist the user with the user's telephone and modem system during a call to the customer service representative from the user.

FIG. 5 is a flow chart illustrating a process 400 for the customer service representative to assist the user with the user's telephone and modem system during the call to the customer service representative from the user. The process 400 is performed by the customer service and is similar to and corresponds with the process 300 performed by the user and the user telephone and modem system described above with reference to FIG. 4. In particular, at step 402, At step 404, the customer service answers the call from the user and connects with the user's telephone and modem system. The customer service representative may greet and/or otherwise speak with the user, such as to request authorization from the user to retrieve information from the user telephone. The customer service representative preferably informs the user that while data transmission is taking place, voice transmission will be temporarily prevented.

At step 406, the customer service modem transmits request for identification and/or status information to the user telephone modem as well as any other requests and/or commands. During data transmission, the modem temporarily prevents voice transmission. Also at step 406, the customer service modem receives confirmation of receipt to the request, confirmation of performance or execution of the commands, and/or results of the execution of the commands. Examples of commands and requests are as described above.

At step 408, the customer service representative speaks again with the user while the user and customer service modems temporarily prevent data transmission. The customer service representative would typically inquire as so any problems the user is experiencing or any questions that the user may have regarding the use of the user telephone and modem system. Alternatively or additionally, the inquiry may be made earlier such as in step 402. The customer service representative may also attempt to verbally address and resolve the customer's inquiries.

At step 410, a determination is made as to whether all issues for the user have been resolved and/or all services for the user have been completed. If not, then the process 400 returns and continues from step 404. Alternatively, the call between the user and customer service is terminated at step 406, ending all data and voice transmission between the two telephone and modem systems.

As is evident, the user telephone features and settings may be controlled by the customer service by transmitting signals to the user telephone and modem system via modems at customer service site and at the user location. In response to the data signals received by the user modem, the various telephone functions of the user telephone and modem system can be controlled thereby.

In each of the processes 300 and 400, steps 306–312 and 404–410 may be repeated several times. For example, the customer service representative may actuate different features on the user telephone in order to diagnose and resolve the user's problem. In one example, the customer service representative may click on an on-screen graphical representation of the visual ringer display on the display to cause the visual ringer on the customer's telephone to flash. The customer service representative may then ask the user if the user can see the flashing visual ringer.

As another example, the customer service representative may assist the user by programming 911 or other emergency memory dials and read the memory contents back to the user to verify that the memory dials are programmed correctly as desired. Furthermore, if the user buys a new telephone and modem system, such as to replace an old telephone and modem system or to upgrade to a newer model, customer service representative can retrieve the information for the user's previous telephone and transfer the settings from the previous telephone to the new telephone. The customer service may also restore the user's telephone system to the memory contents stored in the customer service database, such as when the user accidentally erases or otherwise loses or replaces one or more of the memory contents. The customer service representative may also administer hearing test to assess the user's hearing loss and load recommended settings directly into the user's telephone.

In the case of fault-finding, the customer service representative can instruct the user to assist in performing tests such as replacing the handset in the cradle so that basic checks of the microphone and receive levels can be made. The fault analysis reduces the number of no fault found returns and fosters good will with the users. Volume control can also be tested remotely where volume control is achieved internal to the DSP by a DSP-enabled telephone. The telephone and modem system can also determine the line length to the switch and alert the customer service to long-loop installations. Additionally, power use by the telephone and modem system can be monitored and reported.

The system and method described herein allow the user to easily take advantage of and better utilize more powerful features that may be implemented in the telephone system. It is more user friendly and simple to operate and thus creates good will among the users.

Figure 6:
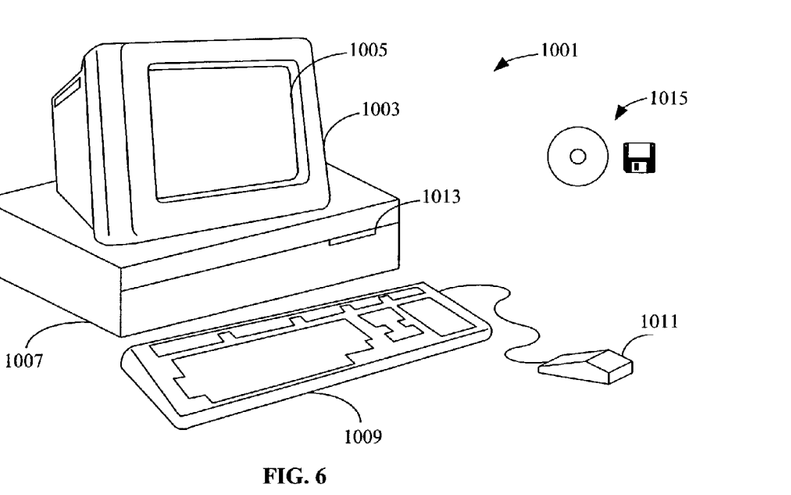
FIG. 6 illustrates an example of a computer system that can be utilized with the various embodiments of method and processing described herein.
Figure 7:
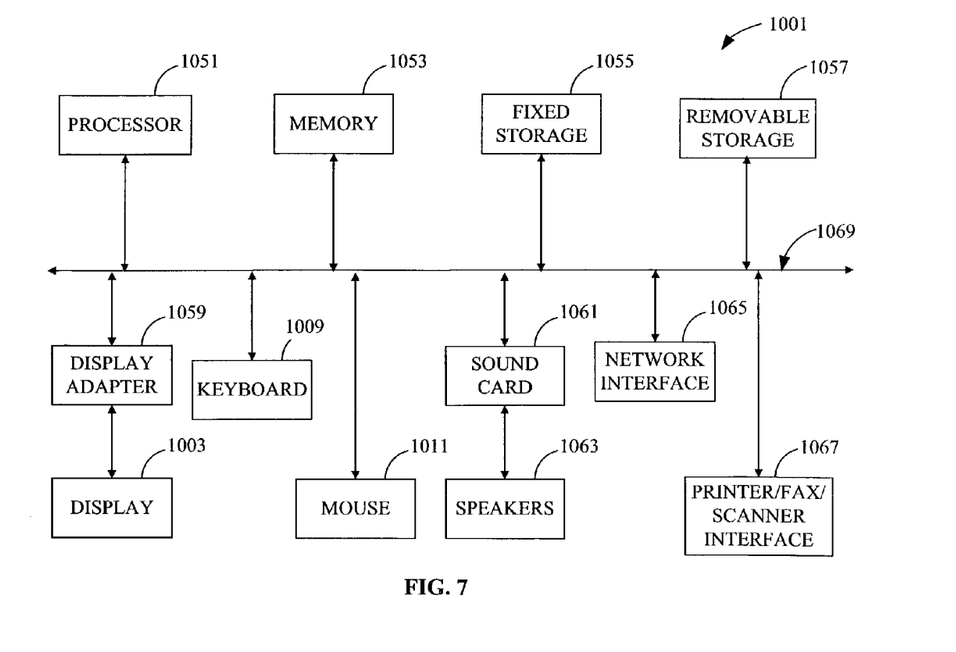
FIG. 7 illustrates a system block diagram of the computer system of FIG. 6.

FIGS. 6 and 7 illustrate a schematic and a block diagram, respectively, of an exemplary general purpose computer system 1001 suitable for executing software programs that implement the methods and processes at the customer service site as described herein. The architecture and configuration of the computer system 1001 shown and described herein are merely illustrative and other computer system architectures and configurations may also be utilized.

The exemplary computer system 1001 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable storage medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The computer system 1001 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU and/or may be performed across a network such as the Internet, intranet networks, or LANs (local area networks) in conjunction with a remote CPU that shares a portion of the processing.

The computer system 1001 may be illustrative of the computer system implemented at the customer service site.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for a customer service representative to provide assistance to a user of a remote telephone and modem system, comprising the steps of:
   connecting a customer service telephone and modem system with the remote user system over a telephone transmission mechanism;
   receiving data signals by the customer service system from the user system over the telephone transmission mechanism, the data signals containing information relating to the user system;
   speaking with the user by transmitting and receiving voice signals to and from the user system over the telephone transmission mechanism; and
   transmitting data signals by the customer service system to the user system, the data signals including a command to control a remotely controllable feature of the user system,
   wherein the user system and the customer representative system selectively alternate between data signal transmissions and voice signal transmissions over the telephone transmission mechanism.

2. A method of claim 1, further comprising the step of obtaining authorization by the customer service system to obtain the data signals containing information relating to the user system.

3. A method of claim 2, wherein the step of obtaining authorization is performed during said step of speaking with the user.

4. A method of claim 2, wherein the step of obtaining authorization is performed during said step of connecting.

5. A method of claim 1, wherein the user system is a DSP-enabled telephone system comprising a digital signal processor and a microprocessor.

6. A method of claim 5, wherein the DSP-enabled telephone and modem system further comprises A/D and D/A converters, wherein data and voice signals transmitted over the telephone transmission mechanism are analog and said A/D converter converts the analog data and voice signals to digital signals.

7. A method of claim 5, wherein the transmitted data signals including the command is utilized by the microprocessor of the user system to control the remotely controllable feature of the user system.

8. A method of claim 1, wherein the command included in the transmitted data signals is a command to control at least one of volume, frequency response, compression ratio, and knee point on the user system.

9. A method of claim 1, further comprising the step of receiving response data signals by the customer service system from the user system over the telephone transmission mechanism, the response data signals enables the customer service system to determine a setting at which the remotely controllable feature of the user system is set.

10. A method of claim 1, further comprising the steps of:
   converting the data signals received by the customer service system to digital data signals;
   generating digital data signals containing the command to control the remotely controllable feature of the user system; and
   converting the generated digital data signal to analog data signal for transmission in said step of transmitting data signals.

11. A method of claim 1, wherein the command included in the transmitted data signals is a command to program contents of a programmable memory on the user system.

12. A method of claim 1, the command included in the transmitted data signals is a command to control an LED light on the user system, the command being to one of turn on, turn off, and flash on and off the LED light on the user system.

13. A method of claim 1, wherein the command included in the transmitted data signals is a command to administer a self-diagnostic test on the user system.

14. A method of claim 1, wherein the command included in the transmitted data signals is a command to administer a hearing test on the user to determine proper telephone settings on the user system.

15. A method of claim 1, wherein the customer service system comprises a database, a display, an input device, and a customer service CPU executing a customer service software package, wherein the CPU is in communication with the database, display, and input device.

16. A method for a user to obtain assistance from a customer service representative for a user telephone and modem system, comprising the steps of:
   initiating a telephone call using the user system to the customer service representative on a remote customer service telephone and modem system, the telephone call being over a telephone transmission mechanism;
   transmitting data signals from the user system to the customer service system over the telephone transmission mechanism, the data signals containing information relating to the user system;
   speaking with the customer service representative by transmitting and receiving voice signals to and from the customer service system over the telephone transmission mechanism; and
   receiving data signals by the user system from the customer service system, the data signals including a command to control a remotely controllable feature of the user system,
   wherein the user system and the customer representative system selectively alternate between data signal transmissions and voice signal transmissions over the telephone transmission mechanism.

17. A method of claim 16, wherein the user modem converts the voice signals received over the telephone transmission mechanism from analog to digital.

18. A method of claim 16, wherein the step of initiating the call comprises the step of activating a customer support call button to cause the user system to connect with the customer support system.

19. A method of claim 18, wherein said step of activating the customer support call button causes the user system to perform said step of transmitting.

20. A method of claim 16, further comprising the step of transmitting authorization by the user system to the customer service system for the customer service system to obtain the data signals containing information relating to the user system.

21. A method of claim 20, wherein the step of transmitting authorization is performed during said step of speaking with the customer service representative.

22. A method of claim 20, wherein the step of transmitting authorization is performed during said step of initiating the telephone call.

23. A method of claim 16, wherein the user system is a DSP-enabled telephone system comprising a digital signal processor and a microprocessor.

24. A method of claim 23, wherein the DSP-enabled telephone and modem system further comprises A/D and D/A converters, wherein data and voice signals transmitted over the telephone transmission mechanism are analog and said A/D converter converts the analog data and voice signals to digital signals.

25. A method of claim 23, wherein the received data signals including the command is utilized by the microprocessor of the user system to control the remotely controllable feature of the user system.

26. A method of claim 16, wherein the command included in the transmitted data signals is a command to control at least one of volume, frequency response, compression ratio, and knee point on the user system.

27. A method of claim 16, further comprising the step of transmitting response data signals by the user system to the customer service system over the telephone transmission mechanism, the response data signals enabling the customer service system to determine a setting at which the remotely controllable feature of the user system is set.

28. A method of claim 16, further comprising the steps of:
converting the data signals received by the user service system to digital data signals;
generating digital data signals containing information relating to the user system; and
converting the generated digital data signal to analog data signal for transmission in said step of transmitting data signals.

29. A method of claim 16, wherein the command included in the received data signals is a command to program contents of a programmable memory on the user system.

30. A method of claim 16, the command included in the received data signals is a command to control an LED light on the user system, the command being to one of turn on, turn off, and flash on and off the LED light on the user system.

31. A method of claim 16, wherein the command included in the received data signals is a command to administer a self-diagnostic test on the user system.

32. A method of claim 16, wherein the command included in the received data signals is a command to administer a hearing test on the user to determine proper telephone settings on the user system.

* * * * *